(12) United States Patent
Franaszek et al.

(10) Patent No.: US 6,889,296 B2
(45) Date of Patent: May 3, 2005

(54) MEMORY MANAGEMENT METHOD FOR PREVENTING AN OPERATING SYSTEM FROM WRITING INTO USER MEMORY SPACE

(75) Inventors: Peter A. Franaszek, Mount Kisko, NY (US); Daniel E. Poff, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 10/080,080

(22) Filed: Feb. 20, 2002

(65) Prior Publication Data

US 2002/0116590 A1 Aug. 22, 2002

Related U.S. Application Data

(60) Provisional application No. 60/270,030, filed on Feb. 20, 2001.

(51) Int. Cl.[7] .............................................. G06F 12/02
(52) U.S. Cl. ..................... 711/156; 711/205; 711/206; 711/207; 711/209; 711/155
(58) Field of Search ................................ 711/205, 206, 711/207, 209, 156, 155

(56) References Cited

U.S. PATENT DOCUMENTS

| 4,849,881 | A | * | 7/1989 | Eguchi | 711/205 |
| 6,092,172 | A | * | 7/2000 | Nishimoto et al. | 711/207 |
| 6,301,647 | B1 | * | 10/2001 | Green | 711/207 |
| 6,351,797 | B1 | * | 2/2002 | Beard et al. | 711/207 |
| 6,532,528 | B1 | * | 3/2003 | Nishimoto et al. | 711/207 |

* cited by examiner

Primary Examiner—T Nguyen
(74) Attorney, Agent, or Firm—F. Chau & Associates, LLC

(57) ABSTRACT

Disclosed is a method of managing memory to prevent an operating system from writing into user memory space, the method comprising providing a translation look-aside buffer (TLB) for storing TLB entries, each said TLB entry comprising a virtual address of a page in system memory space, a real address of said page, a flag entry for storing a value F indicating whether said page is a user page in said user memory space, providing a space recovery mode register comprising a mode entry for storing a value E indicating whether the system is in a normal mode or in a space recovery mode, said value of E set to said space recovery mode when available free user space fall below a predetermined threshold value, and for each said TLB entry, designating said page in system memory space as read-only when F=0 and E=0. An alternative embodiment is also disclosed wherein no modifications to memory structures are required.

20 Claims, 5 Drawing Sheets

MEMORY MANAGEMENT METHOD FOR PREVENTING AN OPERATING SYSTEM FROM WRITING INTO USER MEMORY SPACE

CROSS-REFERENCE TO RELATED APPLICATIONS

This application is based upon, and claims the benefit of, U.S. Provisional Patent Application No. 60/270030, filed on Feb. 20, 2001, the disclosures of which are incorporated by reference herein in their entirety.

BACKGROUND OF THE INVENTION

1. Field of the Invention

This invention relates generally to computer architecture and operating systems, and particularly to memory management in systems where the contents of memory are held in compressed form.

2. Discussion of the Related Art

In compressed-memory systems of the type considered here, the contents of main memory are held in compressed form and decompressed on cache faults. Compression occurs on cache writeback, or incoming I/O. In a system of this type, the number of logical pages in memory is generally different from that indicated by the physical size of memory. That is, the physical size may correspond to say one million pages of 4K bytes each, while the logical number may be twice as large because of the data compression. The number of logical pages will vary with the compression ratio. This ratio, in turn, is a function of the compressibility of the data, which may change quite rapidly.

Such compressed memory systems pose new problems in memory management, as the operating system must manage the number of logical pages as well as the allocation of physical space. Various prior applications, including U.S. patent application Ser. No. 09/648,681, filed Aug. 25, 2000; U.S. Pat. No. 6,279,092, issued Aug. 21, 2001; and U.S. patent application Ser. No. 09/021,333, filed Feb. 10, 1998, disclose solutions for the compressed memory management problem. The solution must include a means for allocating and deallocating pages to smoothly track the effective compression ratio, and also a means for guaranteeing that the system will not stop due to what might be termed memory bankruptcy. Here the system needs to remove some pages from memory. However, such removal may itself require additional physical space for any number of reasons, such as changes in the compressibility of data structures during the pageout process. The result can then be a system crash or hang.

The use of physical space may be due to any of the following: (a) the operating system writing into its own space, (b) a user writing into user space, or (c) the operating system writing into user space. As taught in U.S. Pat. No. 6,279,092, the disclosures of which are incorporated by reference herein, if one reserves sufficient space for (a), or alternatively leaves the operating system pages uncompressed, and stops increased memory usage due to (b), then memory bankruptcy can be prevented for systems where the operating system does not write into user space (i.e., where (c) does not occur). However, some operating systems, including Microsoft NT, do not have this property. There is a need in the art to provide a solution to this problem by preventing (c), that is preventing the operating system from writing into user space.

SUMMARY OF THE INVENTION

Disclosed is a method of managing memory to prevent an operating system from writing into user memory space, the method comprising providing a translation look-aside buffer (TLB) for storing TLB entries, each said TLB entry comprising a virtual address of a page in system memory space, a real address of said page, a flag entry for storing a value F indicating whether said page is a user page in said user memory space, providing a space recovery mode register comprising a mode entry for storing a value E indicating whether the system is in a normal mode or in a space recovery mode, said value of E set to said space recovery mode when available free user space fall below a predetermined threshold value, and for each said TLB entry, designating said page in system memory space as read-only when F=0 and E=0.

In another aspect of the method of the invention said value of E is set to space recovery mode upon an interrupt signal, said interrupt signal generated when said available free user space falls below said threshold value.

In another aspect of the method of the invention said f flag entry is provided in a page directory entry.

In another aspect of the method of the invention said method is executed in the Intel IA32 architecture.

In another aspect of the method of the invention said value of E is set to space recovery mode upon an interrupt signal, said interrupt signal generated when said available free user space falls below said threshold value.

Disclosed is a method of managing memory to prevent an operating system from writing into user memory space, the method comprising providing a status data structure for storing a value indicating whether the system is in a normal mode or in a space recovery mode, said value set to indicate a space recovery mode upon receipt of a signal indicating available free user space has fallen below a threshold value, if said status data structure indicates a space recovery mode, then accessing a shadow page directory for a current process, said shadow page directory comprising a copy of a page directory for said current process and further comprising one or more invalid page directory entries effective in preventing the addressibility of user space.

In another aspect of the method of the invention said signal indicating available user space has fallen below a threshold value is an interrupt.

In another aspect of the method of the invention said shadow page directory is created upon said status data structure value indicating a space recovery mode.

Disclosed is a program storage device readable by machine, tangible embodying a program if instructions executable by the machine to perform method steps for managing memory to prevent an operating system from writing into user memory space, said method steps comprising providing a translation look-aside buffer (TLB) for storing TLB entries, each said TLB entry comprising a virtual address of a page in system memory space, a real address of said page, a flag entry for storing a value F indicating whether said page is a user page in said user memory space, providing a space recovery mode register comprising a mode entry for storing a value E indicating whether the system is in a normal mode or in a space recovery mode, said value of E set to said space recovery mode when available free user space fall below a predetermined threshold value, and for each said TLB entry, designating said page in system memory space as read-only when F=0 and E=0.

In another aspect of the storage device said value of E is set to space recovery mode upon an interrupt signal, said interrupt signal generated when said available free user space falls below said threshold value.

In another aspect of the storage device of the invention said f flag entry is provided in a page directory entry.

In another aspect of the storage device said method is executed in the Intel IA32 architecture.

In another aspect of the storage device said value of E is set to space recovery mode upon an interrupt signal, said interrupt signal generated when said available free user space falls below said threshold value.

Disclosed is a program storage device readable by machine, tangibly embodying a program if instructions executable by the machine to perform method steps for managing memory to prevent an operating system from writing into user memory space, said method steps comprising providing a status data structure for storing a value indicating whether the system is in a normal mode or in a space recovery mode, said value set to indicate a space recovery mode upon receipt of a signal indicating available free user space has fallen below a threshold value, if said status data structure indicates a space recovery mode, then accessing a shadow page directory for a current process, said shadow page directory comprising a copy of a page directory for said current process and further comprising one or more invalid page directory entries effective in preventing the addressibility of user space.

In another aspect of the storage device said signal indicating available user space has fallen below a threshold value is an interrupt.

In another aspect of the storage device said shadow page directory is created upon said status data structure value indicating a space recovery mode.

Disclosed is a computer memory management system, comprising a modified translation look-aside table, modified to comprise a flag entry indicating whether a page in system memory space is a user page, a status register indicating whether the system is in a normal mode or a space recovery mode, wherein said modified translation look-aside buffer is adapted to function in combination with said status register so as to enable a change in addressibility or read/write status of a preselected set of pages upon an interrupt signal, said adaptation comprising executable code for designating a page in memory as read-only when said status register indicated a memory recovery mode and said flag entry indicated said page is a user page.

Disclosed is a method of managing memory, the method comprising using a shadow set of page descriptor entries to modify the read/write status of a preselected set of pages.

Disclosed is a method of managing compressed memory, the method comprising changing a subset of pages to read-only status when the amount of available physical memory space declines below a specified level.

Disclosed is a method of managing compressed memory, the method comprising using shadow page descriptor entries to modify the read/write status of a preselected set of pages, said status modified upon an interrupt signal that signals the decrease of the amount of available physical memory below a threshold value.

DETAILED DESCRIPTION OF PREFERRED EMBODIMENTS

It is the object of this invention to permit an operating system to do pageouts without the possibility of memory bankruptcy. The approach is based on changing the read/write status of pages in memory, based on their address. Implementation can be via software, or changes to the organization of the TLB (translation look-aside buffer).

The memory system will generally maintain a count of physical memory space. For example, in IBM's announced Memory Expansion Technology (MXT), physical memory space is allocated in units, or sectors, of 256 bytes each, and the hardware maintains a count of the number of free, or unallocated, sectors. A threshold can be set for this number, so if the amount of free memory decreases below this given value, an interrupt is triggered. In this invention, this interrupt would be non-maskable, known as an "NMI". Following the non-maskable interrupt, sections of memory which do not require read/write status to implement I/O or page erasures would have their status be changed to read-only. The operating system then performs pageouts or page erasures sufficient memory is recovered, after which normal read/write status is returned.

A main difference from earlier approaches is that addressibility or read/write status for a set of pages is changed given the transition to a low-memory condition, which, as noted above, may be signaled by a threshold transition and an interrupt. The status change permits the deletion of pages from memory, while effectively stopping other activity which might increase the need for physical memory. The change of status is obtained via either modifications to the operating system software, or to the addressing path in the hardware, or both, as described below.

The embodiments of the invention described herein use aspects of the Intel IA32 architecture, but those skilled in the art will understand that the ideas and principles are generalizable to other systems without undue experimentation.

Figure 1:
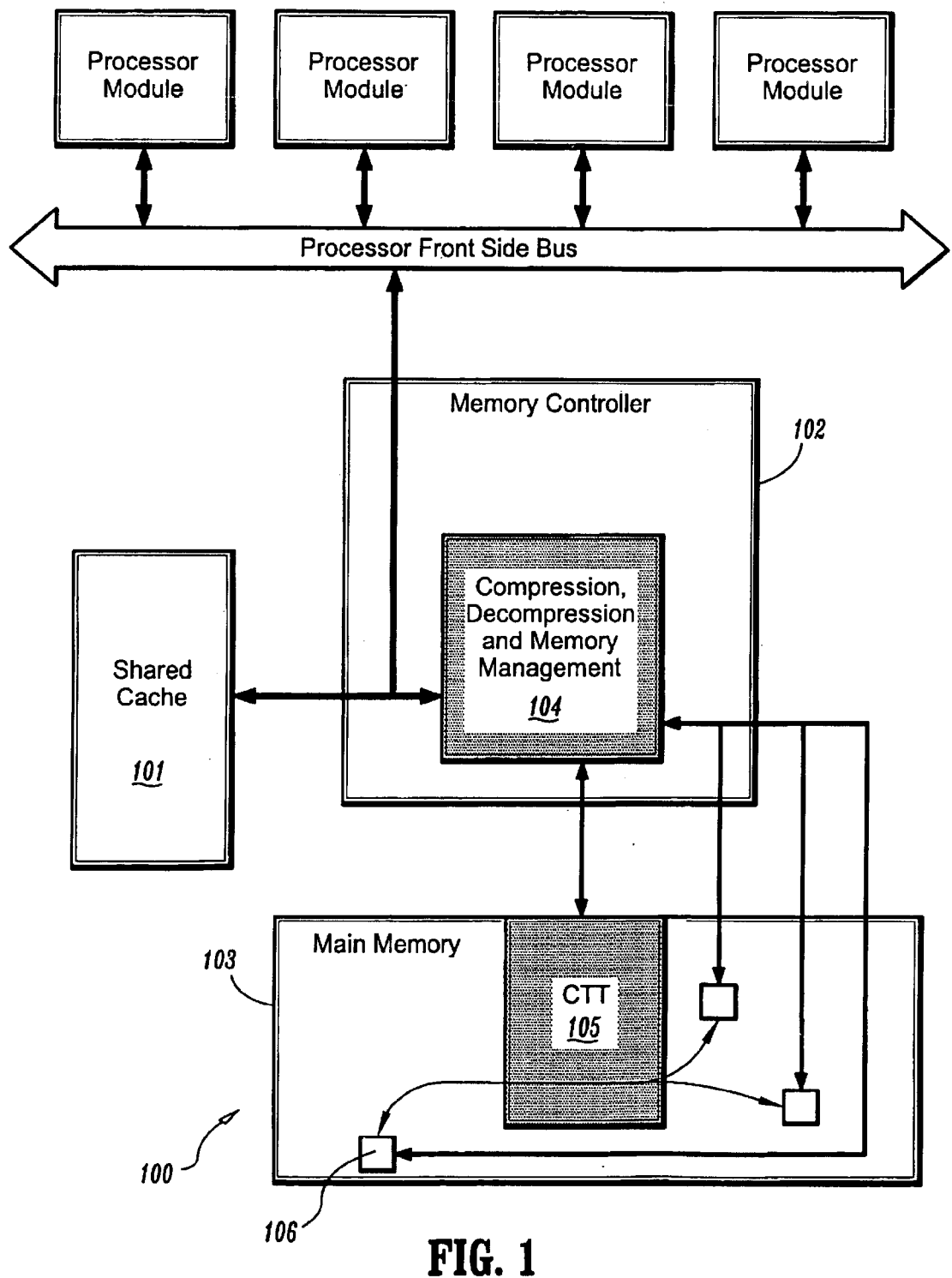
FIG. 1 shows a block diagram of the system.

FIG. 1 shows a block diagram of the system. This conforms to IBM's Memory Expansion Technology (MXT) as described in R. B. Tremaine, P. A. Franaszek, J. T. Robinson, C. O. Schulz, T. B. Smith, M. E. Wazlowski, and P. M. Bland, *IBM Memory Expansion Technology (MXT)*, IBM J, R.& D., Vol.45, No.2, pp.271–286, March 2001, the disclosures of which are incorporated by reference herein in their entirety.

Referring to FIG. 1, a central processing unit 100 comprises an attached cache 101 and memory controller 102. A main memory 103 contains compressed data. The memory controller includes a compressor/decompressor 104. Cache lines are decompressed when fetched from the main memory 103 and compressed when written to the main memory 103.

The real addresses issued by the processor are further translated by the controller 102 into physical addresses using a compression translation table 105. The memory controller keeps a count of the available free space in the memory. If this count crosses any of one or more thresholds set by the operating system, the controller 102 issues an interrupt to the processor 100. In the embodiments illustrated here, the interrupt is a non-maskable interrupt (NMI) that is issued when a threshold representing a low memory condition is crossed. Given this interrupt, certain regions in memory, as specified by the operating system, have their status changed to read-only. The effect is that processing threads which attempt to write into these areas are stopped. This permits the operating system to free physical space by a combination of page erasures and pageouts. These OS operations are guaranteed to require no more space than is reserved for OS expansion, as detailed above. In certain cases, some additional pages may need to be created by the OS in order to do such pageouts. The maximum number of such pages is known in advance, and space is reserved for their storage in memory. Once sufficient physical space has been recovered via these pageout operations, normal addressibility to memory is restored.

Figure 3:
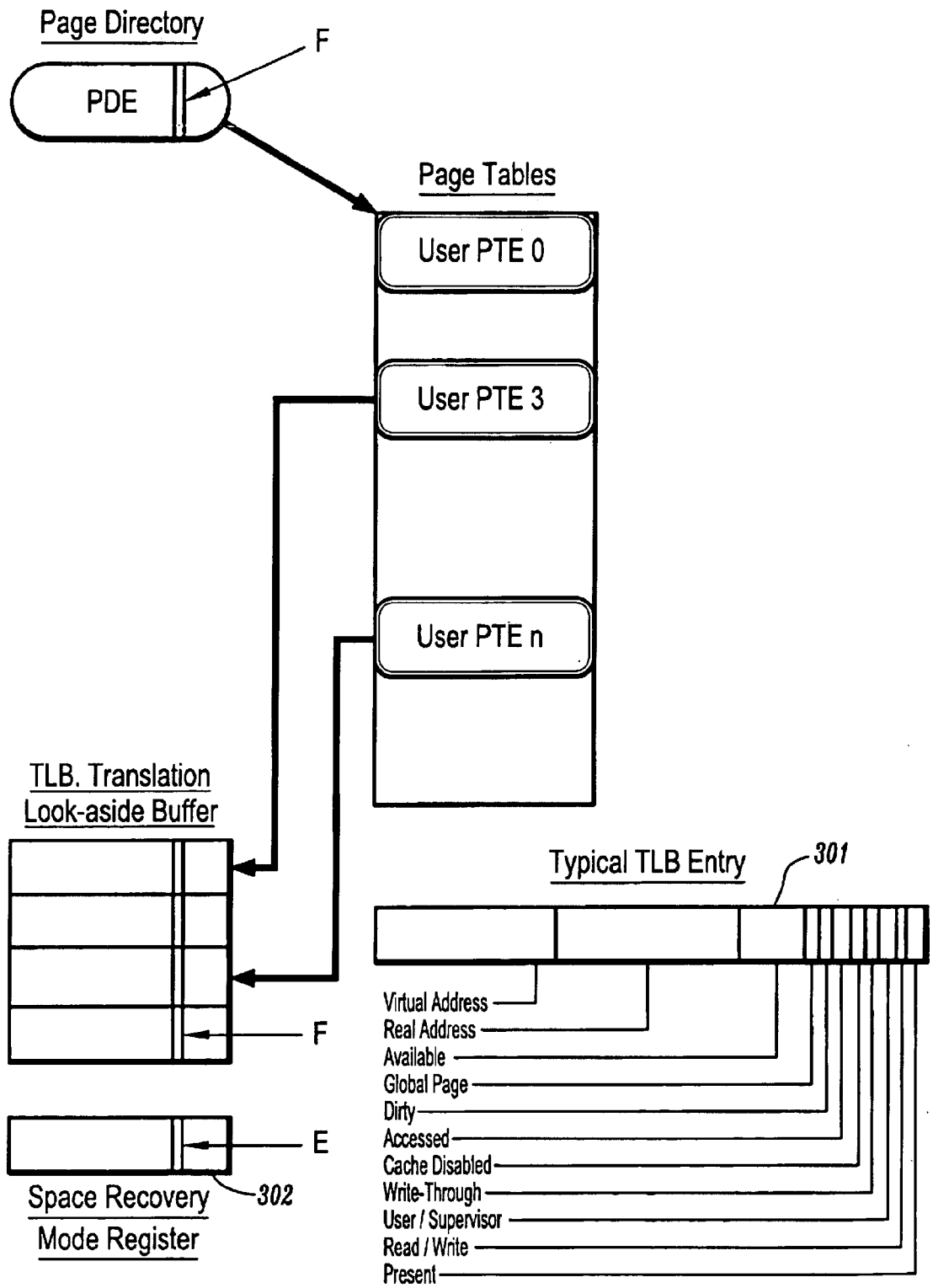
FIG. 3 shows a schematic of a translation look-aside buffer (TLB) of the invention.

FIG. 3 shows a schematic of a translation look-aside buffer (TLB). This is used to translate program virtual addresses into what are termed real addresses. Illustrated is the contents 301 of a typical TLB entry, the contents typically comprising the processor virtual address for a given page, the real address assigned to this page, and a plurality of flags indicating, for example, the page read/write status and whether the current entry is valid.

The invention adds a space recovery mode register 302 comprising an entry E, with values 1 or 0, indicates respectively whether the current system state is normal or is in space recovery mode. When the amount of available physical space declines below the low-memory condition threshold mentioned above, the value is set to zero. It is reset to 1 when sufficient space has been recovered from RAM.

In this invention, each entry in an Intel IA32 Page Descriptor Table and corresponding page entries in the TLB are given an additional flag F with values 1 or 0. The value is, for example, 1 if the corresponding page table entries (PTEs) hold operating system data, or more generally if both read and write capability for these pages are necessary for I/O operations. The value is 0 otherwise. Given an NMI triggered by the low memory threshold, the value of E is set to 0 and all pages whose entries F in the page descriptor table are 0 are then treated as read-only. That is, any page with entry F=0 in the TLB is treated as read-only if E=0, and otherwise its read/write status is determined by the currently existing flag(s). After the OS completes its recovery of physical space, the value of E is returned to 1.

Figure 2:
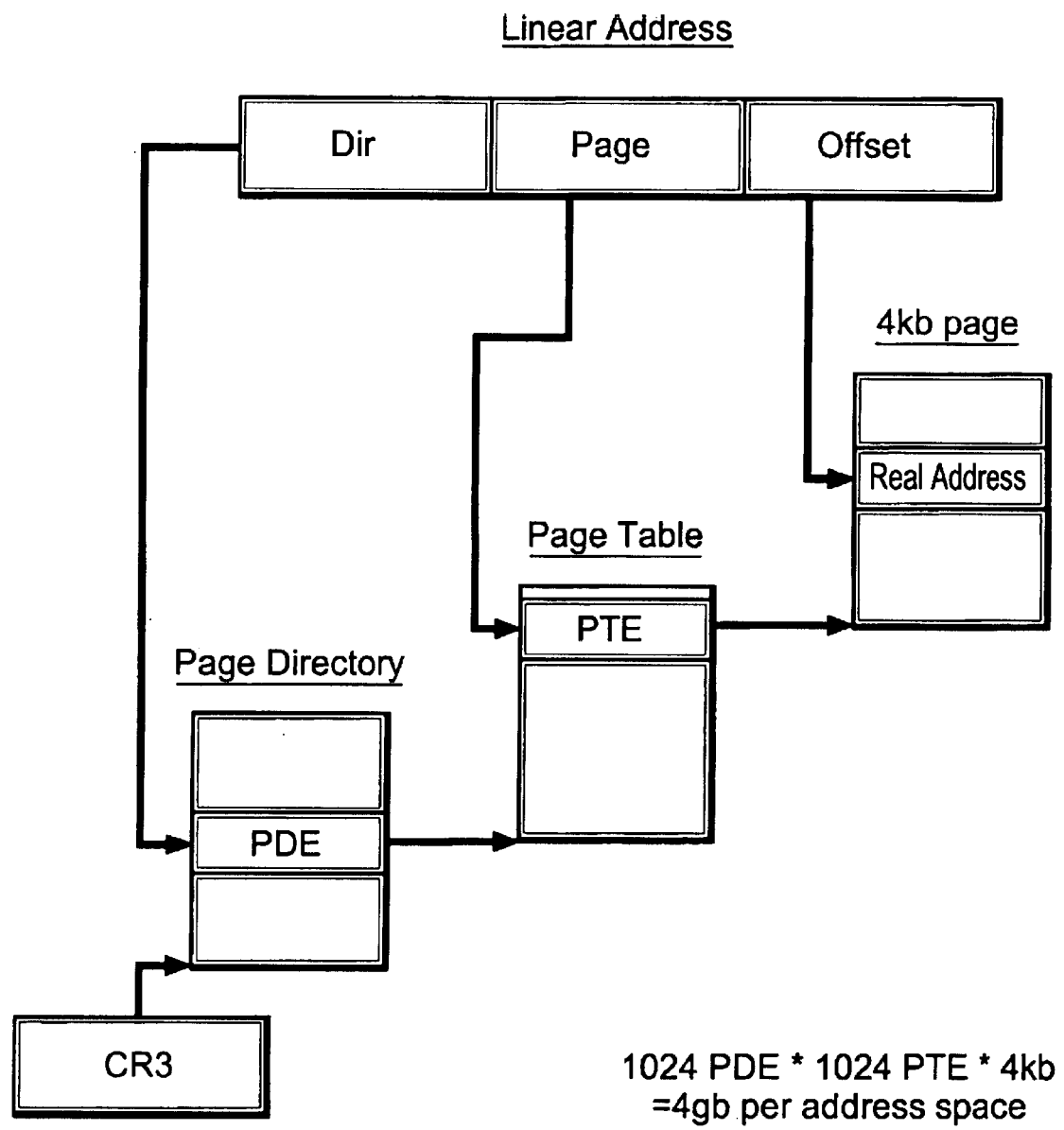
FIG. 2 illustrates the Page Descriptor Entries in the Intel IA32 architecture.

FIG. 2 shows the virtual addressing format of the IA32 and will be familiar to anyone skilled in the art.

Figure 5:
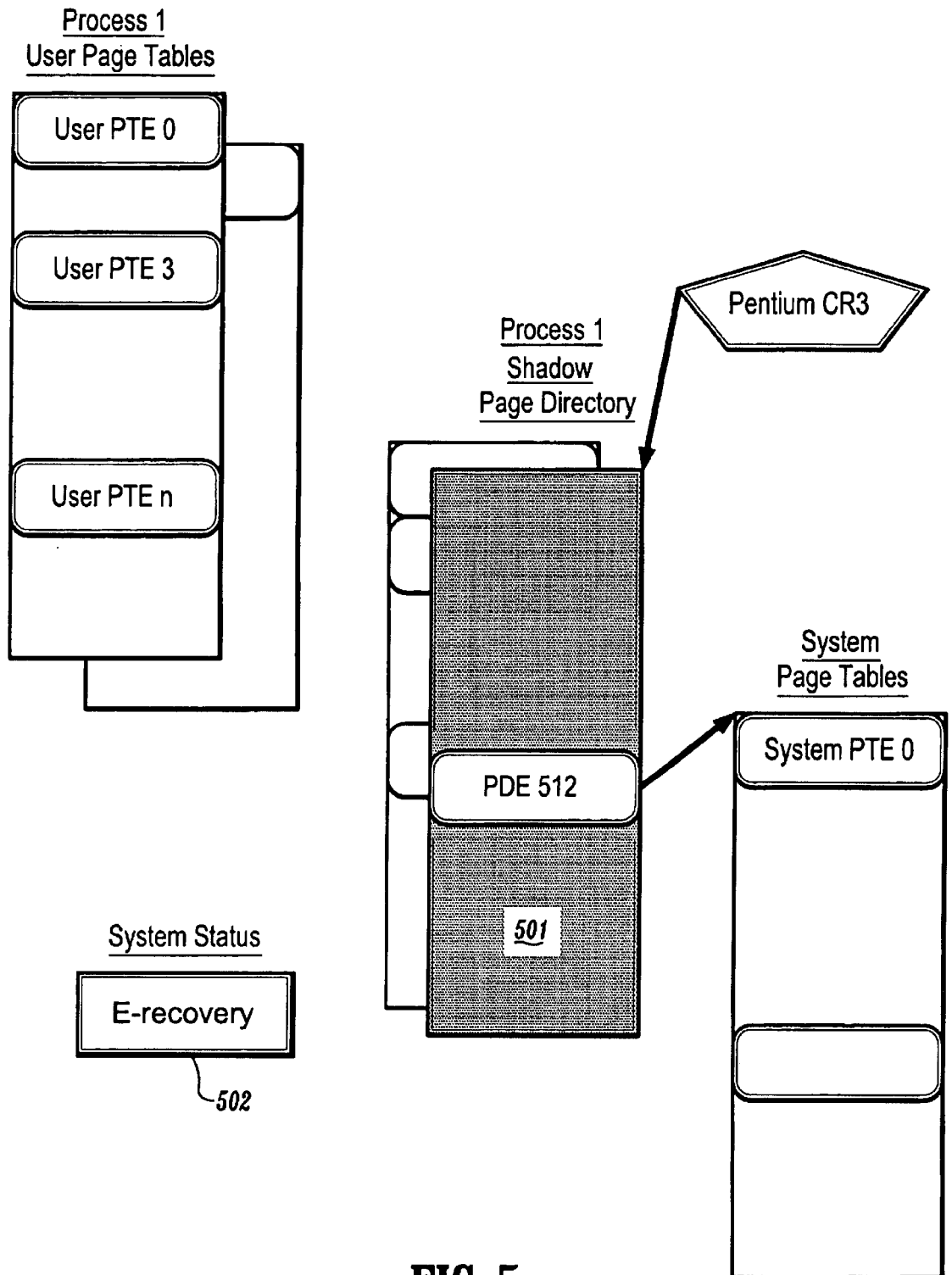
FIG. 5 shows another embodiment of the invention.

Referring to FIG. 5, there is shown an alternative embodiment requiring no modifications to the processor TLB or page directory entries (PDEs). Instead, the system maintains shadow copies of the page directories, 501. The shadow directories are the same as the originals, except that the page directory entries (PDEs) mapping user space are marked 'invalid'. In space recovery mode, the shadow page directories are used in place of the original page directories, thereby blocking addressibility of user space. The transition to shadow directories occurs initially within the NMI handler, and subsequently at context transitions. After space recovery, context transitions among user address spaces are resumed with the original directories and accessibility to user space returns.

A variation would be to create the shadow PDEs only when necessary, namely when the NMI occurs. Upon the NMI, a shadow is built for the current process, and subsequent context transition would build shadows as long as the system remained in space recovery mode. In this case, the shadows are used to save the original page descriptor. PDEs addressing user space would then be marked invalid or read-only. Updates to the PDEs would be made to the shadows while the system remained in space recovery mode. This scheme would need a way to 'detour' updating a PDE from the NMI if memory management were updating the same PDE. With this scheme, the shadow does not need to be updated every time the principal is.

Figure 4:
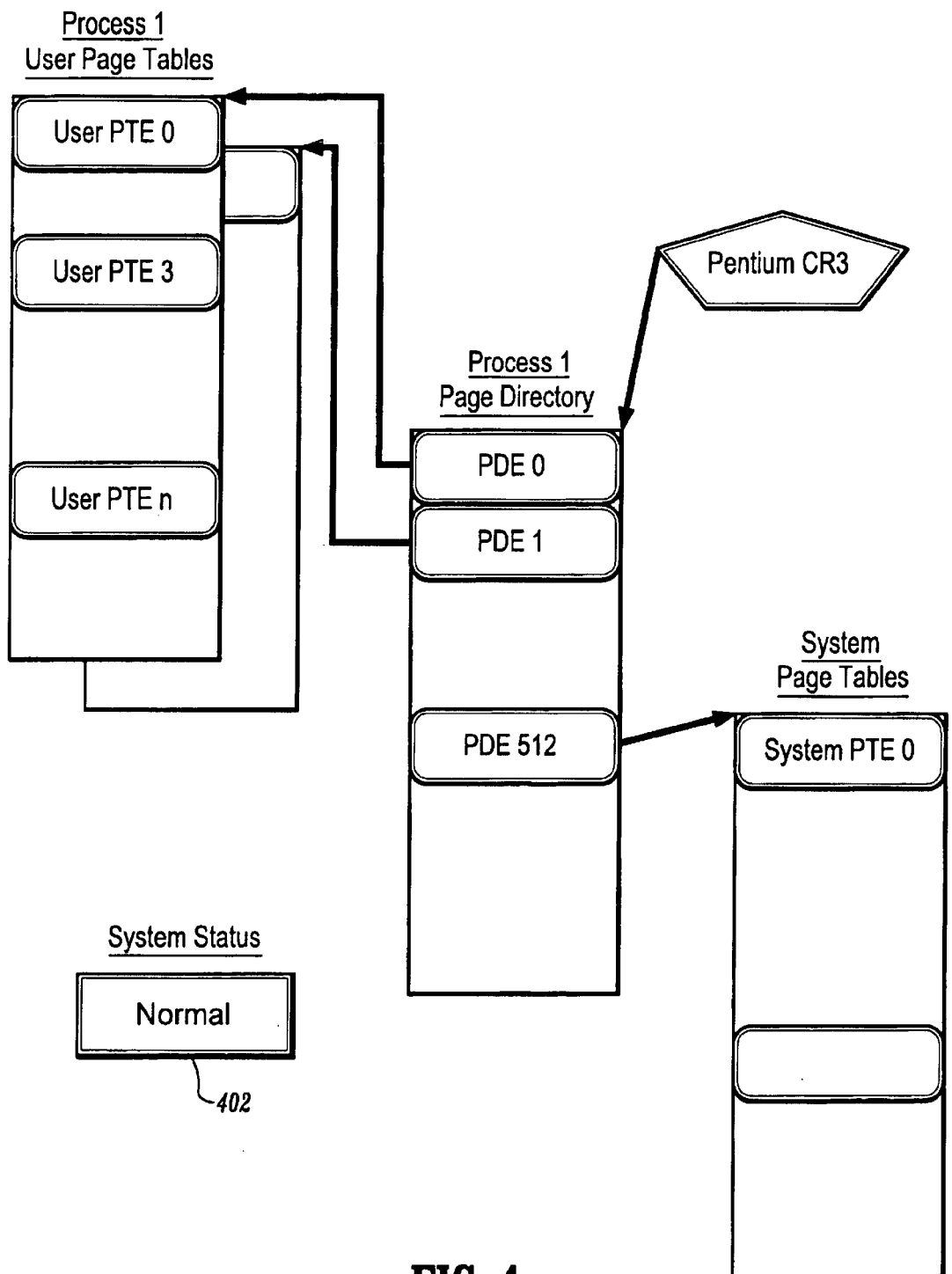
FIG. 4 illustrates shadow page descriptor entries of the invention.

FIGS. 4 and 5 illustrate the data structures involved. There is a status data structure 402, 502 reserved for indicating the current mode of operation for the system and a per-process entry for the address of its shadow page directory. Given an NMI, the shadow directory 501 is made active for the current process. Subsequent context transitions establish addressability using shadow directories as long as the system remains in space recovery mode. Once space recovery is complete, the status data structure is returned to normal operation and context transitions will revert to the original page directories, reestablishing user addressibility.

The invention may be adapted to automation as by, for example, tangibly embodying a program of instructions upon a storage media, readable by a machine capable of executing the instructions, such as a semiconductor device, microprocessor, or computer.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of managing memory to prevent an operating system from writing into user memory space, the method comprising:
    providing a translation look-aside buffer (TLB) for storing TLB entries, each said TLB entry comprising:
        a virtual address of a page in system memory space;
        a real address of said page;
        a flag entry for storing a value F indicating whether said page is a user page in said user memory space;
    providing a space recovery mode register comprising a mode entry for storing a value E indicating whether the system is in a normal mode or in a space recovery mode, said value of E set to said space recovery mode when available free user space fall below a predetermined threshold value; and
    for each said TLB entry, designating said page in system memory space as read-only when F=0 and E=0.

2. The method of claim 1 wherein said value of E is set to space recovery mode upon an interrupt signal, said interrupt signal generated when said available free user space falls below said threshold value.

3. The method of claim 1 wherein said f flag entry is provided in a page directory entry.

4. The method of claim 3 wherein said method is executed in the Intel IA32 architecture.

5. The method of claim 4 wherein said value of E is set to space recovery mode upon an interrupt signal, said interrupt signal generated when said available free user space falls below said threshold value.

6. A method of managing memory to prevent an operating system from writing into user memory space, the method comprising:

provided a status data structure for storing a value indicating whether the system is in a normal mode or in a space recovery mode, said value set to indicate a space recovery mode upon receipt of a signal indicating available free user space has fallen below a threshold value;

if said status data structure indicates a space recovery mode, then accessing a shadow page directory for a current process, said shadow page directory comprising a copy of a page directory for said current process and further comprising one or more invalid page directory entries effective in preventing the addressibility of user space.

7. The method of claim 6 wherein said signal indicating available user space has fallen below a threshold value is an interrupt.

8. The method of claim 6 wherein said shadow page directory is created upon said status data structure value indicating a space recovery mode.

9. A program storage device readable by machine, tangible embodying a program if instructions executable by the machine to perform method steps for managing memory to prevent an operating system from writing into user memory space, said method steps comprising:

providing a translation look-aside buffer (TLB) for storing TLB entries, each said TLB entry comprising:
a virtual address of a page in system memory space;
a real address of said page;
a flag entry for storing a value F indicating whether said page is a user page in said user memory space;

providing a space recovery mode register comprising a mode entry for storing a value E indicating whether the system is in a normal mode or in a space recovery mode, said value of E set to said space recovery mode when available free user space fall below a predetermined threshold value; and for each said TLB entry, designating said page in system memory space as read-only when F=0 and E=0.

10. The method of claim 9 wherein said value of E is set to space recovery mode upon an interrupt signal, said interrupt signal generated when said available free user space falls below said threshold value.

11. The method of claim 9 wherein said f flag entry is provided in a page directory entry.

12. The method of claim 11 wherein said method is executed in the Intel IA32 architecture.

13. The method of claim 12 wherein said value of E is set to space recovery mode upon an interrupt signal, said interrupt signal generated when said available free user space falls below said threshold value.

14. A program storage device readable by machine, tangibly embodying a program if instructions executable by the machine to perform method steps for managing memory to prevent an operating system from writing into user memory space, said method steps comprising:

providing a status data structure for storing a value indicating whether the system is in a normal mode or in a space recovery mode, said value set to indicate a space recovery mode upon receipt of a signal indicating available free user space has fallen below a threshold value;

if said status data structure indicates a space recovery mode, then accessing a shadow page directory for a current process, said shadow page directory comprising a copy of a page directory for said current process and further comprising one or more invalid page directory entries effective in preventing the addressibility of user space.

15. The method of claim 14 wherein said signal indicating available user space has fallen below a threshold value is an interrupt.

16. The method of claim 14 wherein said shadow page directory is created upon said status data structure value indicating a space recovery mode.

17. A method of managing memory to enable a change of read/write status of a selected set of pages in a computer system, the method comprising:

providing a register to store flags indicating whether the system is in normal mode, or alternatively in a special mode, said mode which may be set by an interrupt;

providing a modified translation look-aside buffer for storing TLB entries, each entry comprising at least:
a virtual address of a page in memory;
the real address of said page;
the read/write status of the page in the normal mode;
flag entries designating whether this page is in the selected set; and
the read/write status of the page in the special mode.

18. The method of claim 17, further comprising using a shadow set of page descriptor entries to modify the read/write status of a preselected set of pages.

19. The method of claim 17, further comprising changing a subset of pages to read-only status when the amount of available physical memory space declines below a specified level.

20. The method of claim 17, further comprising using shadow page descriptor entries to modify the read/write status of a preselected set of pages, said status modified upon an interrupt signal that signals the decrease of the amount of available physical memory below a threshold value.

* * * * *